United States Patent [19]

Nagase et al.

[11] Patent Number: 5,077,355

[45] Date of Patent: Dec. 31, 1991

[54] EPOXY RESIN/IMIDAZOLE/POLYPHENOL ADDUCT AS EPOXY CURING AGENT

[75] Inventors: Rihei Nagase, Tokyo; Akira Yasuda, Souka; Masao Kawashima, Warabi, all of Japan

[73] Assignee: Somar Corporation, Japan

[21] Appl. No.: 484,886

[22] Filed: Feb. 26, 1990

[30] Foreign Application Priority Data

Feb. 28, 1989 [JP] Japan ................................. 1-47572

[51] Int. Cl.$^5$ ...................... C08L 63/02; C08L 63/04
[52] U.S. Cl. .................................. 525/526; 525/484; 525/934
[58] Field of Search ................. 525/526, 484, 934

[56] References Cited

U.S. PATENT DOCUMENTS

| | | | |
|---|---|---|---|
| 3,647,726 | 3/1972 | Ulmer | 260/18 |
| 4,066,625 | 3/1978 | Yallourakis | 525/524 |
| 4,067,838 | 1/1978 | Hayashi et al. | 523/404 |
| 4,223,097 | 9/1980 | Johannes et al. | 525/107 |

FOREIGN PATENT DOCUMENTS

| | | | |
|---|---|---|---|
| 0532199 | 10/1956 | Canada | 525/526 |
| 293977 | 12/1988 | European Pat. Off. . | |
| 2394590 | 1/1979 | France . | |
| 60-186578 | 3/1984 | Japan . | |
| 63-193970 | 8/1988 | Japan . | |
| 63-221174 | 9/1988 | Japan . | |
| 2022592 | 12/1979 | United Kingdom . | |
| 85/04666 | 10/1985 | World Int. Prop. O. | 525/526 |
| 87/02043 | 4/1987 | World Int. Prop. O. | 525/526 |

*Primary Examiner*—Melvyn I. Marquis
*Assistant Examiner*—Robert E. L. Sellers, II
*Attorney, Agent, or Firm*—Lorusso & Loud

[57] ABSTRACT

A powder coating composition is disclosed which includes an epoxy resin which is solid at room temperature, and a curing agent, characterized in that the curing agent includes an adduct obtained by reaction of (a) a polyfunctional epoxy resin, (b) an imidazole compound having a secondary amino group in the imidazole ring thereof and (c) a polyhydric phenol.

8 Claims, No Drawings

EPOXY RESIN/IMIDAZOLE/POLYPHENOL ADDUCT AS EPOXY CURING AGENT

This invention relates generally to a powder coating composition and, more specifically, to an epoxy resin powder coating composition which is quickly hardenable and which is stable and has a long shelf life.

In the past, as a curing agent for epoxy resin powder coating compositions there has been used a material which reacts with the epoxy resin at relatively a high temperature. Thus, the hardening of such coating compositions has been generally performed at 180°-200° C. for 10-20 minutes. Recently, epoxy resin powder coating compositions capable of being hardened at a low temperature of 140°-160° C. have been proposed. Such quick hardening type coating compositions have a problem in stability. Namely, with time, the powder coating compositions become gradually poor in fluidity in a molten state.

To cope with this problem the use of a curing agent whose active site is chemically protected has been proposed. While such a curing agent can improve the shelf life, the powder coating composition is unsatisfactory in quick hardenability because the activity of the curing agent is reduced. There is also a proposal to use an encapsulated curing agent. However, the formation of curing agent-containing microcapsules requires a high cost. Additionally, the microcapsules are apt to be broken when subjected to mechanical shocks to cause degradation of the intended stability.

The present invention has been made to solve the above-mentioned problem and is aimed at the provision of a powder coating composition which can be quickly hardened at a relatively low temperature and which has good shelf life. In accordance with the present invention there is provided a powder coating composition comprising an epoxy resin which is solid at room temperature, and a curing agent, characterized in that said curing agent includes an adduct obtained by reaction of (a) a polyfunctional epoxy resin, (b) an imidazole compound having a secondary amino group in the imidazole ring thereof and (c) a polyhydric phenol.

The present invention will now be described in detail below.

The epoxy resin to be used in the coating composition may be any conventionally used solid epoxy resin. Examples of suitable epoxy resins include glycidyl ether-type epoxy resins such as glycidyl ethers of bisphenol A, bisphenol S, bisphenol F, bisphenol AD, brominated bisphenol A, glycerin, a polyalkylene oxide, a phenol novolak resin and orthocresol novolak resin; and glycidyl ester-type epoxy resins such as glycidyl esters of dimer acid and isophthalic acid. Glycidyl amine-type epoxy resins, alicyclic epoxy resins, aliphatic epoxy resins, heterocyclic epoxy resins and halogenated epoxy resins may also be used for the purpose of the present invention. These epoxy resins may be used singly or as a mixture of two or more. If desired, the solid epoxy resin may be used in conjunction with a liquid epoxy resin as long as the mixture is solid at room temperature.

The present invention is characterized by a curing agent which includes an adduct obtained by reaction of (a) a polyfunctional epoxy resin, (b) an imidazole compound having a secondary amino group in the imidazole ring thereof and (c) a polyhydric phenol.

The polyfunctional epoxy resin (a) to be used as one reactant for the formation of the adduct is one which has two or more epoxy groups in its molecule. Epoxy resins which have a melting point of 40° C. especially those which are liquid at room temperature are suitably used. Polyglycidyl ethers of polyhydric phenols are preferably used. As such polyglycidyl ethers, those which have a weight per epoxy equivalent of not greater than 300 are especially suitably used. A typical example of a polyglycidyl ether of a polyhydric phenol is diglycidyl ether of bisphenol A. Examples of other polyfunctional epoxy resins include polyglycidyl esters of aliphatic polyhydric compounds, polyglycidyl esters of polycarboxylic acids and polyglycidyl esters of polymers of unsaturated resin acids.

The imidazole compound (b) to be used for the formation of the adduct should contain a secondary amino group in the imidazole ring thereof. Examples of suitable imidazole compounds include imidazole, 2-methylimidazole, 2-ethylimidazole, 2-ethyl-4-methylimidazole, 2-phenylimidazole, 2-undecylimidazole and 2-heptylimidazole.

The polyhydric phenol (c) to be reacted with the polyfunctional epoxy resin (a) and the imidazole compound (b) may preferably include resorcinol, catechol, hydroquinone, pyrogallol, gallic acid, gallic acid esters, bisphenol A, tetrabromobisphenol A add bisphenol S.

The above three components, i.e. (a) polyfunctional epoxy resin, (b) imidazole compound and (c) polyhydric phenol, are reacted to form an adduct. For reasons of obtaining a quickly hardenable coating composition having good shelf life, it is preferred that the adduct have a softening point of 100°-150° C. and a viscosity at 150° C. of 100-1000 poises.

For the purpose of obtaining suitable adduct, it is advisable to use the three components in such a proportion that the ratio by equivalent of the epoxy group of the polyfunctional epoxy resin (a) to the secondary amino group (imino group) of the imidazole compound (b) is in the range of 1.2-2.5, preferably 1.6-2.2 and the ratio by equivalent of the hydroxyl group of the polyhydric phenol (c) to the secondary amino group of the imidazole compound (b) is in the range of 0.4-2.0, preferably 0.6-1.2.

When the amount of the epoxy group of the polyfunctional epoxy resin (a) is less than 1.2 equivalents per one equivalent of the secondary amino group of the imidazole compound (b), the softening point of the resulting adduct is so low that the powder coating composition containing such an adduct cannot show satisfactory storage life. Too large an amount of the epoxy group of the polyfunctional epoxy resin (a) in excess of 2.5 equivalents per one equivalent of the secondary amino group of the imidazole compound (b), on the other hand, causes the formation of an infusible, three-dimensional structure in the adduct so that a coating composition containing such an adduct fails to give a homogeneous, uniform coat.

When the amount of the hydroxyl group of the polyhydric phenol (c) is less than 0.4 equivalent per one equivalent of the secondary amino group of the imidazole compound (b), the viscosity in a molten state of the resulting adduct becomes undesirably high. Too large an amount of the hydroxyl group of the polyfunctional epoxy resin (a) in excess of 2.0 equivalents per one equivalent of the secondary amino group of the imidazole compound (b), on the other hand, is also disadvantageous because the resulting adduct becomes hygroscopic and has a low softening point so that a coating composition containing such an adduct fails to show good storage life.

The reaction of the above three components (a)–(c) may be carried out with or without using a solvent. The use of a solvent is preferable since the reaction can proceed smoothly without causing excess increase of temperature and viscosity of the reaction mixture. Illustrative of suitable solvents are methyl ethyl ketone, tetrahydrofuran, dioxane, toluene, ethylene glycol monomethyl ether and ethylene glycol monoethyl ether. The reaction is generally performed for 1–5 hours under reflux with stirring.

After the completion of the reaction, the solvent is removed to obtain a solid adduct. The adduct is ground to 60 mesh (Tyler) or finer, preferably 200 mesh or finer. The pulverization of the adduct can be easily effected because the softening point thereof is relatively high.

The finely divided adduct is used as a curing agent for the formation of the powder coating composition according to the present invention. The adduct is generally used in an amount of 0.2–40 parts by weight per 100 parts by weight of the solid epoxy resin. If desired, the adduct may be used in conjunction with a known epoxy hardener such as an acid anhydride, dicyanodiamide or a dibasic acid dihydrizide. For instance, the conjoint use with an acid anhydride can improve electrical properties of the hardened resin. The conjoint use with dicyanodiamide can improve adhesion strength.

The powder coating composition of the present invention may further contain various conventionally used additives such as a pigment, a filler and a thixotropic agent. The solid epoxy resin, adduct and other optional ingredients are homogeneously mixed by a melt-mixing method or a dry blending method to give the powder coating composition according to the present invention.

Since the adduct used as a curing agent can be easily pulverized into fine powder, the adduct may be homogeneously mixed with the solid epoxy resin. Further, the adduct has a low viscosity in the molten state. As a result, the powder coating composition can be hardened in a facilitated manner. In addition, since the adduct has a relatively high softening point, the powder coating composition is stable and has a good shelf life.

The following examples will further illustrate the present invention. In the examples, "part" is by weight. The abbreviations used in the examples are as follows:
MZ : 2-Methylimidazole
EMI : 2-Ethyl-4-methylimidazole
PZ : 2-Phenylimidazole
Py : Pyrogallol
BPS : Bisphenol S
BPA : Bisphenol A
DICY : Dicyanodiamide
TL : Toluene
MEK : Methyl ethyl ketone
MC : Ethylene glycol monomethyl ether In the examples, the following methods are adopted for the measurement of softening point, viscosity in molten state, gellation time, shelf life and hardenability:

Softening Point

According to Durran's Mercury Method.

Viscosity in Molten State

Sample is heated to 150° C. and the viscosity of the molten sample at 150° C. is measured by a rheometer (Rheomat 115 cone-plate type, manufactured by Contraves Inc.)

Gellation Time

According to JIS C2104, the time required for a sample to gel at 150° C. is measured. A gellation time of less than 80 seconds is regarded as being satisfactory as a quickly hardenable powder coating composition.

Shelf Life

Fresh sample is allowed to stand at 40° C. and horizontal fluidity is measured once a day. The test is continued until the fluidity becomes less than half of the initial value. The number of days required represents the shelf life of the sample. A shelf life of 14 days or more is regarded as being satisfactory. The fluidity is measured as follows: The sample (1g) is shaped into a disc having a diameter of 16 mm. The disc is placed on a flat, horizontal steel plate and heated thereon at 140° C. for melting and gellation. The diameter (D) of the gelled sample is measured for the calculation of fluidity according to the equation:

$$Fluidity\ (\%) = (D - 16) \times 100/16$$

Hardenability

Sample is coated on a substrate to obtain a cured coat having a thickness of about 0.3 mm. The curing is performed at 150° C. for 30 minutes. The surface of the coat is wiped with a cloth wetted with acetone. If the surface shows no change in gloss, the sample is regarded as having good hardenability. If a change of the gloss is observed, the sample is evaluated as being poor in hardenability.

SYNTHESIS EXAMPLE 1

Into a 200 ml three-necked flask equipped with a reflux condenser, a stirrer and a dropping funnel were charged 8.2 g (0.1 equivalent) of MZ (component (a)), 2.5 g (0.06 equivalent) of Py (component (c)) and 50 ml of TL. The mixture was stirred at room temperature to obtain a clear solution. Then, 30.4 g (0.16 equivalent) of Epikote 828 (component (a), bisphenol A epoxy resin, weight per epoxy equivalent: 190, manufactured by Yuka Shell Epoxy Inc.) dissolved in 30 ml of TL were added to the solution. The mixture was reacted for 3 hours under reflux with stirring. After completion of the reaction, TL was removed in vacuo and the residues were dried at 200° C. for 1 hour to obtain an adduct (A-1) as red brown solids. This adduct A-1 had a softening point and a viscosity in a molten state as shown in Table 1.

SYNTHESIS EXAMPLES 2–7

Synthesis Example 1 was repeated in the same manner as described except that the kinds and amounts of component (a) (polyfunctional epoxy resin), component (b) (imidazole compound) and component (c) (polyhydric phenol) were changed as shown in Table 1, thereby to obtain adducts A-2 to A-7 whose properties were as shown in Table 1.

COMPARATIVE SYNTHESIS EXAMPLES 1 and 2

Synthesis Example 1 was repeated in the same manner as described using the reactants shown in Table 1, thereby to obtain adducts P-1 and P-2 whose properties were as shown in Table 1.

TABLE 1

| Adduct | Component (a) (equivalent) | Component (b) (equivalent) | Component (c) (equivalent) | Solvent | Softening Point (°C.) | Viscosity (poise) |
|---|---|---|---|---|---|---|
| A-1 | Epikote 828 (0.16) | MZ (0.1) | Py (0.06) | TL | 115 | 450 |
| A-2 | Epikote 828 (0.2) | MZ (0.1) | BPS (0.1) | MC | 130 | 600 |
| A-3 | Epikote 828 (0.2) | MZ (0.1) | BPA (0.12) | MEK | 115 | 200 |
| A-4 | Epikote 828 (0.27) | MZ (0.1) | Py (0.06) | TL | 155 | 8500 |
| A-5 | Epikote 828 (0.16) | MZ (0.1) | Py (0.22) | TL | 100 | 80 |
| A-6 | Epikote 828 (0.18) | EMI (0.1) | Py (0.02) BPA (0.88) | MEK | 120 | 300 |
| A-7 | Epikote 828 (0.2) | PZ (0.1) | BPA (0.1) | MEK | 125 | 230 |
| P-1 | Epikote 828 (0.14) | MZ (0.1) | — | TL | 109 | 50 |
| P-2 | Epikote 828 (0.16) | MZ (0.1) | — | TL | 115 | 4500 |

EXAMPLE 1

The adduct A-1 obtained in Synthesis Example 1 was ground to 330 mesh or finer and the resultant finely divided adduct was extruded together with Epikote 1004 (bisphenol A epoxy resin, weight per epoxy equivalent: 950, softening point: 98° C., manufactured by Yuka Shell Epoxy Inc.) at 110° C. using an extruder (manufactured by CSI Inc.). The mixing ratio of the adduct and the epoxy resin is shown in Table 2. After cooling, the extrudates were ground to obtain a powder coating composition with a particle size of 60 mesh or finer. The gellation time, shelf life and hardenability of the composition were measured to obtain the results summarized in Table 2.

EXAMPLES 2-5

Example 1 was repeated in the same manner as described except that the adducts A-2 to A-5 were used in place of the adduct A-1. The properties of the compositions are shown in Table 2.

EXAMPLE 6

The adduct A-1 obtained in Synthesis Example 1 was ground to an average particle size of 5 μm and this powder was mixed, at room temperature, with Epikote 1004 which had been ground to 60 mesh or finer, thereby to obtain a powder coating composition whose properties are shown in Table 2.

COMPARATIVE EXAMPLES 1 and 2

Example 1 was repeated in the same manner as described except that the adduct P-1 and P-2 were used in place of the adduct A-1. The results are shown in Table 2.

COMPARATIVE EXAMPLE 3

Epikote 1004 was ground to 60 mesh or finer and mixed, at room temperature, with MZ to obtain a coating composition whose properties are shown in Table 2.

COMPARATIVE EXAMPLE 4

Epikote 1004 ground to 60 mesh or finer was mixed, at room temperature, with the adduct P-1 grounded to an average particle size of 5 μm to obtain a coating composition whose properties are shown in Table 2.

TABLE 2

| Example No. | Epikote 1004 (part) | Curing Agent* (part) | Gellation Time (sec) | Shelf Life (days) | Hardenability |
|---|---|---|---|---|---|
| 1 | 100 | A-1 (4.0) | 58 | over 14 | good |
| 2 | 100 | A-2 (5.8) | 70 | over 14 | good |
| 3 | 100 | A-3 (5.8) | 65 | over 14 | good |
| 4 | 100 | A-4 (6.0) | 112 | over 14 | poor |
| 5 | 100 | A-5 (4.6) | 50 | 10 | good |
| 6 | 100 | A-1 (4.0) | 67 | over 14 | good |
| Comp. 1 | 100 | P-1 (3.4) | 57 | 5 | good |
| Comp. 2 | 100 | P-2 (3.8) | 95 | 12 | poor |
| Comp. 3 | 100 | MZ (0.8) | 60 | 2 | good |
| Comp. 4 | 100 | P-1 (3.4) | 65 | 10 | good |

*The amount of the curing agent used in all of the examples and comparative examples is the same when calculated as the amount of 2-methylimidazole.

EXAMPLE 7

The adduct A-1 obtained in Synthesis Example 1 was ground to 330 mesh or finer and the resultant finely divided adduct was extruded together with Epikote 1002 (bisphenol A epoxy resin, weight per epoxy equivalent: 650, softening point: 83° C., manufactured by Yuka Shell Epoxy Inc.) at 85° C. using an extruder (manufactured by CSI Inc.). The mixing ratio of the adduct and the epoxy resin is shown in Table 3. After cooling, the extrudates were ground to obtain a powder coating composition with a particle size of 60 mesh or finer. The gellation time, shelf life and hardenability of the composition were measured to obtain the results summarized in Table 3.

EXAMPLES 8-11

Example 7 was repeated in the same manner as described except that the adducts A-2 to A-5 were used in place of the adduct A-1. The properties of the compositions are shown in Table 3.

COMPARATIVE EXAMPLES 5 and 6

Example 7 was repeated in the same manner as described except that the adduct P-1 and P-2 were used in place of the adduct A-1. The results are shown in Table 3.

TABLE 3

| Example No. | Epikote 1002 (part) | Curing Agent* (part) | Gellation Time (sec) | Shelf Life (days) | Hardenability |
|---|---|---|---|---|---|
| 7 | 100 | A-1 (4.0) | 55 | over 14 | good |

TABLE 3-continued

| Example No. | Epikote 1002 (part) | Curing Agent* (part) | Gellation Time (sec) | Shelf Life (days) | Hardenability |
|---|---|---|---|---|---|
| 8 | 100 | A-2 (5.8) | 69 | over 14 | good |
| 9 | 100 | A-3 (5.8) | 63 | over 14 | good |
| 10 | 100 | A-4 (6.0) | 150 | over 14 | poor |
| 11 | 100 | A-5 (4.6) | 60 | 12 | good |
| Comp. 5 | 100 | P-1 (3.4) | 62 | 9 | good |
| Comp. 6 | 100 | P-2 (3.8) | 105 | over 14 | poor |

*The amount of the curing agent used in all of the examples and comparative examples is the same when calculated as the amount of 2-methylimidazole

EXAMPLE 12

The adduct A-1 obtained in Synthesis Example 1 was ground to 330 mesh or finer and the resultant finely divided adduct was extruded together with Epikote 1004 and dicyanodiamide at 110° C. using an extruder (manufactured by CSI Inc.). The mixing ratio of the adduct, DICY and the epoxy resin is shown in Table 4. After cooling, the extrudates were ground to obtain a powder coating composition with a particle size of 60 mesh or finer. The gellation time, shelf life and hardenability of the composition were measured to obtain the results summarized in Table 4.

EXAMPLES 13 and 14

Example 12 was repeated in the same manner as described except that the adducts A-6 and A-7 were used in place of the adduct A-1. The properties of the compositions are shown in Table 4.

COMPARATIVE EXAMPLE 7

Example 12 was repeated in the same manner as described except that the adduct A-1 was not used at all. The coating composition failed to harden sufficiently when heated at 150° C. for 30 minutes.

TABLE 4

| Example No. | Epikote 1004 (part) | Curing Agent (part) | Gellation Time (sec) | Shelf Life (days) | Hardenability |
|---|---|---|---|---|---|
| 12 | 100 | A-1 (2.0) DICY (4.0) | 68 | over 14 | good |
| 13 | 100 | A-6 (1.7) DICY (4.0) | 75 | over 14 | good |
| 14 | 100 | A-7 (1.8) DICY (4.0) | 80 | over 14 | good |

What is claimed is:

1. A powder coating composition comprising an epoxy resin which is solid at room temperature, and a curing agent, characterized in that said curing agent includes an adduct obtained by reaction of (a) a polyfunctional epoxy resin, (b) an imidazole compound having a secondary amino group in the imidazole ring thereof and (c) a polyhydric phenol.

2. A powder coating composition as claimed in claim 1, wherein said polyfunctional epoxy resin is liquid at room temperature.

3. A powder coating composition as claimed in claim 2, wherein said polyfunctional epoxy resin is diglycidyl ether of bisphenol A having a weight per epoxy equivalent of 300 or less.

4. A powder coating composition as claimed in claim 1, wherein said imidazole compound is at least one compound selected from the group consisting of imidazole, 2-methylimidazole, 2-ethylimidazole, 2-ethyl-4-methylimidazole, 2-phenylimidazole, 2-undecylimidazole and 2-heptylimidazole.

5. A powder coating composition as claimed in claim 1, wherein said polyhydric phenol is at least one compound selected from the group consisting of resorcinol, catechol, hydroquinone, pyrogallol, gallic acid, gallic acid esters, bisphenol A, tetrabromobisphenol A and bisphenol S.

6. A powder coating composition as claimed in claim 1, wherein said polyfunctional epoxy resin, imidazole compound and polyhydric phenol are reacted in such a proportion that the ratio by equivalent of the epoxy group of said polyfunctional epoxy resin to the secondary amino group of said imidazole compound and the ratio by equivalent of the hydroxyl group of said polyhydric phenol to the secondary amino group of said imidazole compound are in the ranges of 1.2–2.5 and 0.4–2.0, respectively.

7. A powder coating composition as claimed in claim 1, wherein said adduct has a softening point of 100–150° C. and a viscosity at 150° C. of 100–1000 poises.

8. A powder coating composition as claimed in claim 1, wherein said adduct is used in an amount of 0.2–40 parts by weight per 100 parts by weight of said solid epoxy resin.

* * * * *